(12) United States Patent
Watazu et al.

(10) Patent No.: US 9,417,725 B1
(45) Date of Patent: Aug. 16, 2016

(54) TOUCH PANEL HAVING PRESS DETECTION FUNCTION

(71) Applicant: NISSHA PRINTING CO., LTD., Kyoto-shi, Kyoto (JP)

(72) Inventors: Yuji Watazu, Kyoto (JP); Yoshiko Suetomi, Kyoto (JP); Eiji Kakutani, Kyoto (JP); Keisuke Ozaki, Kyoto (JP); Junichi Shibata, Kyoto (JP); Shuzo Okumura, Kyoto (JP); Ryomei Omote, Kyoto (JP); Juichi Murata, Kyoto (JP); Takao Hashimoto, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/900,961

(22) PCT Filed: May 22, 2014

(86) PCT No.: PCT/JP2014/063551
§ 371 (c)(1),
(2) Date: Dec. 22, 2015

(87) PCT Pub. No.: WO2014/208225
PCT Pub. Date: Dec. 31, 2014

(30) Foreign Application Priority Data

Jun. 23, 2013 (JP) .................. 2013-131214

(51) Int. Cl.
*G06F 3/041* (2006.01)
*G06F 3/044* (2006.01)

(52) U.S. Cl.
CPC .............. *G06F 3/0414* (2013.01); *G06F 3/044* (2013.01); *G06F 3/0416* (2013.01)

(58) Field of Classification Search
CPC ..... G06F 3/0416; G06F 3/0414; G06F 3/044; G06F 3/045

USPC ..................... 345/173, 174; 178/18.01–18.07
See application file for complete search history.

(56) References Cited

U.S. PATENT DOCUMENTS

| 2007/0229464 A1 | 10/2007 | Hotelling et al. |
| 2009/0244021 A1 | 10/2009 | Matsuo et al. |
| 2013/0027340 A1 | 1/2013 | Kodani et al. |

(Continued)

FOREIGN PATENT DOCUMENTS

| JP | 2004-125571 A | 4/2004 |
| JP | 2007-272898 A | 10/2007 |

(Continued)

OTHER PUBLICATIONS

International Search Report in PCT/JP2014/063551 dated Jul. 1, 2014.

*Primary Examiner* — Dmitriy Bolotin
(74) *Attorney, Agent, or Firm* — Global IP Counselors, LLP

(57) ABSTRACT

A piezoelectric sensor that can perform position detection and load detection. The touch panel having press detection function can detect the pressing load inputted to the pressing surface. An upper electrode, an upper insert member, an intermediate electrode, a lower insert member, and a lower electrode are arranged away from the pressing surface in this order. Among the upper electrode, the intermediate electrode, and the lower electrode, capacitance detection electrodes Cx, Cy for detecting the pressing position, and detection electrodes S for measuring the electric charge according to the pressure when the operation is inputted to the touch panel 1 having press detection function are included. One of the upper insert member and the lower insert member is composed of an insulating body, and the other is composed of a piezoelectric body.

6 Claims, 11 Drawing Sheets

(56) References Cited

U.S. PATENT DOCUMENTS

2014/0152618 A1   6/2014   Ando
2015/0193055 A1   7/2015   Ando
2015/0355771 A1*  12/2015  Watazu ................ G06F 3/0414
                                                        345/174

FOREIGN PATENT DOCUMENTS

| JP | 2009-237673 A | 10/2009 |
| JP | 2011-221720 A | 11/2011 |
| WO | 2013/021835 A1 | 2/2013 |
| WO | 2014-045847 A1 | 3/2014 |

* cited by examiner

FIG. 8

| No. | Upper electrode 10 | Upper insert member 40 | Intermediate electrode 20 | Lower insert member 50 | Lower electrodes 30 |
|---|---|---|---|---|---|
| A1 | $C_x \cdot C_y$ | Insulating body (I) | S | Piezoelectric member (P) | G |
| A2 | $C_x$ | Piezoelectric member (P) | S | Insulating body (I) | $C_y$ |
| A3 | $C_x \cdot G$ | Piezoelectric member (P) | S | Insulating body (I) | $C_y$ |
| A4 | $C_x \cdot G$ | Insulating body (I) | S | Piezoelectric member (P) | $C_y$ |
| A5 | $C_x$ | Piezoelectric member (P) | S | Insulating body (I) | $C_y \cdot G$ |
| A6 | $C_x$ | Insulating body (I) | S | Piezoelectric member (P) | $C_y \cdot G$ |
| A7 | G | Piezoelectric member (P) | S | Insulating body (I) | $C_x \cdot C_y$ |
| A8 | G | Insulating body (I) | S | Piezoelectric member (P) | $C_x \cdot C_y$ |
| A9 | G | Piezoelectric member (P) | $C_x \cdot S$ | Insulating body (I) | $C_y$ |
| A10 | G | Insulating body (I) | $C_x \cdot S$ | Piezoelectric member (P) | $C_y$ |
| A11 | $C_x$ | Piezoelectric member (P) | $C_y \cdot S$ | Insulating body (I) | G |

FIG. 9

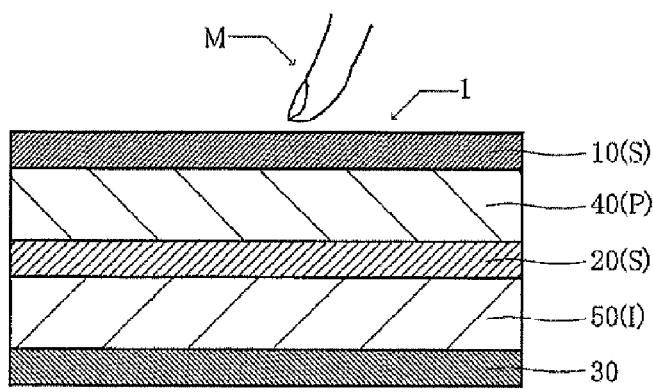

FIG. 10

| No. | Upper electrode 10 | Upper insert member 40 | Intermediate electrode 20 | Lower insert member 50 | Lower electrodes 30 |
|---|---|---|---|---|---|
| B1 | $C_x \cdot G$ | Piezoelectric member (P) | S | Insulating body (I) | $C_y$ |
| B2 | S | Piezoelectric member (P) | $C_x$ | Insulating body (I) | $C_y$ |
| B3 | $C_x \cdot S$ | Piezoelectric member (P) | G | Insulating body (I) | $C_y$ |
| B4 | $C_x$ | Piezoelectric member (P) | S | Insulating body (I) | $C_y$ |
| B5 | $C_x$ | Piezoelectric member (P) | S, G | Insulating body (I) | $C_y$ |
| B6 | S | Piezoelectric member (P) | $C_x \cdot C_y$ | Insulating body (I) | G |
| B7 | S, G | Piezoelectric member (P) | $C_x$ | Insulating body (I) | $C_y$ |
| B8 | S | Piezoelectric member (P) | $C_x \cdot G$ | Insulating body (I) | $C_y$ |
| B9 | G | Piezoelectric member (P) | $C_x \cdot S$ | Insulating body (I) | $C_y$ |
| B10 | S | Piezoelectric member (P) | G | Insulating body (I) | $C_x \cdot C_y$ |
| B11 | G | Piezoelectric member (P) | S | Insulating body (I) | $C_x \cdot C_y$ |

FIG. 11

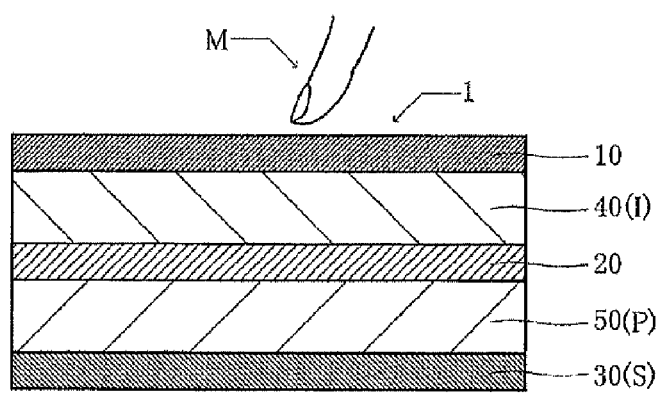

| No. | Upper electrode 10 | Upper insert member 40 | Intermediate electrode 20 | Lower insert member 50 | Lower electrodes 30 |
|---|---|---|---|---|---|
| C1 | $C_x$ | Insulating body (I) | $C_yG$ | Piezoelectric member (P) | S |
| C2 | $C_x$ | Insulating body (I) | G | Piezoelectric member (P) | $C_yS$ |

TOUCH PANEL HAVING PRESS DETECTION FUNCTION

CROSS-REFERENCE TO RELATED APPLICATIONS

This U.S. National stage application claims priority under 35 U.S.C. §119(a) to Japanese Patent Application No. 2013-131214, filed in Japan on Jun. 23, 2013, the entire contents of Japanese Patent Application Nos. 2013-131214 are hereby incorporated herein by reference.

BACKGROUND

1. Field of the Invention

The present invention relates to touch panels having press detection function.

2. Background Art

Conventionally, note PCs having a touch pad have been known. Such note PCs are provided with UI having good usability, i.e., when moving a cursor, it is possible to freely operate the cursor on the display by just tracing the operation surface of the note PC with a finger.

Furthermore, recently, electronic devices having a touch panel such as cellar phones, smart phones, and game machines have been popular. Such electronic devices have a structure of a transparent touch panel provided on a display panel such as LCD, so that it is possible to perform the operation by just touching buttons displayed on the display panel with a finger or a stylus. Furthermore, it is possible to input characters and draw diagrams with a handwriting input. Accordingly, the previously mentioned electronic devices employs UI with which the intuitive input is possible.

However, according to the touch panel, it is impossible to detect the applied load. Accordingly, it is impossible to detect letter description such as brush writing or pushing action, which means that it is insufficient as UI.

On the other hand, piezoelectric sensors have been known which can detect the applied load. For example, according to Japanese Patent Publication 2004-125571, a transparent piezoelectric sensor is disclosed which includes a transparent pressure sensitive layer and a transparent conductive layer.

SUMMARY

However, since the piezoelectric sensor in Japanese Patent Publication 2004-125571 is made of a plurality of transparent pressure sensitive layers, position detection can be achieved to a certain degree, but the accuracy of position detection was bad. Although it is possible to improve the accuracy of position detection by reducing an area of the transparent pressure sensitive layer and increase the number in Japanese Patent Publication 2004-125571, it is difficult to detect a lot of sensor signals, i.e., it is actually impossible.

The present invention was conceived to solve the previously mentioned problems, and it is an object of the present invention to provide a touch panel having press detection function that can precisely detect position and pressure.

In order to achieve the previously mentioned object, the present invention is configured as below.

The touch panel having press detection function according to the present invention is one that can detect the pressing load inputted to a pressing surface.

The touch panel includes an upper electrode, an upper insert member, an intermediate electrode, a lower insert member, and a lower electrode, arranged away from the pressing surface in this order.

Among the upper electrode, the intermediate electrode, and the lower electrode, capacitance detection electrodes configured to detect pressing position when input is applied to the touch panel, and detection electrodes for measuring the electric charge configured to detect electric charge according to the pressing are included.

One of the upper insert member and the lower insert member may be composed of an insulating body, and the other may be composed of a piezoelectric body.

According to one of the aspects, the intermediate electrode may include the detection electrodes for measuring the electric charge.

According to one of the aspects, the upper electrode may include the capacitance detection electrodes.

According to one of the aspects, the upper electrode may include the capacitance detection electrodes, and the lower electrode may be a reference potential electrode that is fixed to a constant electrical potential.

According to one of the aspects, the upper electrode may include first capacitance detection electrodes, the intermediate electrode may include second capacitance detection electrodes, the lower electrode may include a reference potential electrode that is fixed to a constant electrical potential.

According to one of the aspects, the upper insert member may be composed of an insulating body, the lower insert member may be composed of a piezoelectric body, the upper electrode may include first capacitance detection electrodes, and the lower electrode may include second capacitance detection electrodes.

According to one of the aspects, the upper insert member may be composed of a piezoelectric body, the lower insert member may be composed of an insulating body, and the upper electrode or the intermediate electrode may include the electrodes for measuring the electric charge.

According to one of the aspects, the upper insert member may be composed of an insulating member, and the lower insert member may be composed of a piezoelectric body, at least one of the upper electrode and the intermediate electrode may include capacitance detection electrodes, and the lower electrode may include the electrodes for measuring the electric charge.

According to one of the aspects, the upper insert member may be an insulating body, the lower insert member may be composed of a piezoelectric body, at least one of the upper electrode and the intermediate electrode may include the capacitance detection electrodes, the intermediate electrode may include a reference potential electrode that is fixed to a constant electrical potential, and the lower electrode may include the electrodes for measuring the electric charge.

According to one of the aspects, an adhesive layer may be disposed between the intermediate electrode and the lower insert member.

According to one of the aspects, an adhesive layer may be disposed between the upper insert member and the intermediate electrode.

According to one of the aspects, an adhesive layer may be disposed in the following spaces:

(1) a space defined between the upper electrode and the upper insert member;

(2) a space defined between the upper insert member and the intermediate electrode; and (3) a space defined between the lower insert member and the lower electrode.

According to one of the aspects, a support member may be disposed on an upper surface of the upper electrode.

According to one of the aspects, the support member may be a protect member.

According to one of the aspects, a display member may be provided below the touch panel, and the touch panel may be transparent.

In the touch panel having press detection function according to the present invention, when the pressure is applied to the touch panel, it is possible to precisely detect the position and pressure.

BRIEF DESCRIPTION OF THE DRAWINGS

FIG. 8 is a view showing examples of the configuration of the touch panel having press detection function;

FIG. 9 is a cross section of the touch panel having press detection function;

FIG. 10 is a view showing examples of the configuration of the touch panel having press detection function;

FIG. 11 is a cross section of the touch panel having press detection function;

DESCRIPTION OF EMBODIMENTS

Embodiments according to the present invention will be described below in detail with reference to figures. The dimensions, materials, shapes and relative positions of parts or portions described in the embodiments of the present invention are merely described as examples, and do not limit the scope of the present invention unless otherwise specified.

Figure 1:
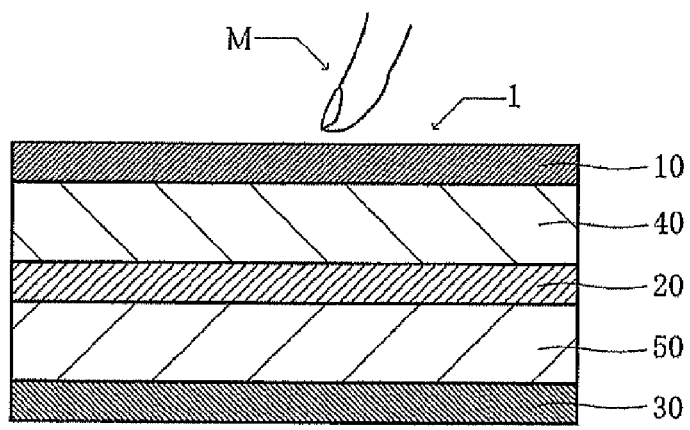
FIG. 1 is a cross section of the touch panel having press detection function.

1. First Embodiment (1) The Entire Structure of the Touch Panel Having Press Detection Function Referring to FIG. 1, the touch panel having press detection function according to the first embodiment of the present invention will be described. FIG. 1 is a cross section of the touch panel having press detection function.

As shown in FIG. 1, a touch panel 1 includes an upper electrode 10, an intermediate electrode 20, a lower electrode 30, an upper insert member 40, and a lower insert member 50.

The previously mentioned members are disposed, from the pressing surface of the touch panel 1 in the order of: the upper electrode 10, the upper insert member 40, the intermediate electrode 20, the lower insert member 50, and the lower electrode 30.

Hereinbelow, the configuration of the touch panel 1 having press detection function will be described in detail.

(2) Electrodes

The electrodes constituting the touch panel 1 are the upper electrode 10, the intermediate electrode 20, and the lower electrode 30. The upper electrode 10, the intermediate electrode 20, and the lower electrode 30 may be either capacitance detection electrodes, detection electrodes for measuring the electric charge, a reference potential electrode, or a combination thereof.

The capacitance detection electrodes detect pressing position based on change in capacitance generated between the capacitance detection electrodes when the pressing means M makes contact with the touch panel 1 and applies the pressure to the touch panel 1.

The electrodes for measuring the electric charge detect electric charge generated when the pressure is applied to the touch panel 1. The reference potential electrode has a constant potential. The pressing means M represents fingers or stylus pens that applies the pressure to the touch panel 1.

The upper electrode 10, the intermediate electrode 20, and the lower electrode 30 can be made of conductive materials. The conductive material may include transparent conductive oxide such as Indium-Tin-Oxide (ITO) and Tin-Zinc-Oxide (TZO), or conductive polymer such as Polyethylenedioxythiophene (PEDOT). In this case, the electrodes can be formed with vapor deposition or screen printing, for example.

The conductive material may include conductive metals such as copper and silver. In this case, the electrodes can be formed with vapor deposition, or metal paste such as copper paste and silver paste.

Furthermore, the conductive material may include a binder and conductive materials, such as carbon nanotube, metal grain, and metal nanofiber, disbursed therein.

(3) Insert Member

The insert member constituting the touch panel 1 are the upper insert member 40 and the lower insert member 50. The upper insert member 40 and the lower insert member 50 are composed of a piezoelectric body or an insulating body. Specifically, if the upper insert member 40 is composed of the piezoelectric body, the lower insert member 50 is composed of the insulating body. If the upper insert member 40 is composed of the insulating body, the lower insert member 50 is composed of the piezoelectric body.

(4) Piezoelectric Body

Material of the piezoelectric layer may include inorganic piezoelectric materials or organic piezoelectric materials.

The inorganic piezoelectric material is barium titanate, lead titanate, lead (Pb) zirconate titanate, potassium niobate, lithium niobate, and lithium tantalate, for example.

The organic piezoelectric materials may include fluoride compound or its copolymer, and polymer material including chirality. The fluoride compound or its copolymer may be polyvinylidene fluoride, vinylidene fluoride-tetrafluoroethylene copolymer, or vinylidene fluoride-trifluoroethylene copolymer, for example. The polymer material having chirality may be PLAA or PDLA, for example.

(5) Insulating Body

Materials of the insulating body may include organic materials, inorganic materials, and organic-inorganic hybrid materials. The organic materials may include acryl, Polycarbonate, polyethylene-telephthalate, and cycloolefin polymer, for example. The inorganic materials may include glass plates, for example. The organic-inorganic hybrid materials may include material having resin in which glass fiber is mixed.

(6) Effects

The touch panel 1 having press detection function of the present invention may include the capacitance detection electrodes, the electrodes for measuring the electric charge, and the piezoelectric body. Accordingly, when the pressure is applied to the touch panel 1, it is possible to detect the pressing position using the capacitance detection electrodes, and detect electric charge generated by the pressure using the electrodes for measuring the electric charge. As a result, it is possible to detect the pressing position and pressing load applied to the touch panel 1.

Figure 2:
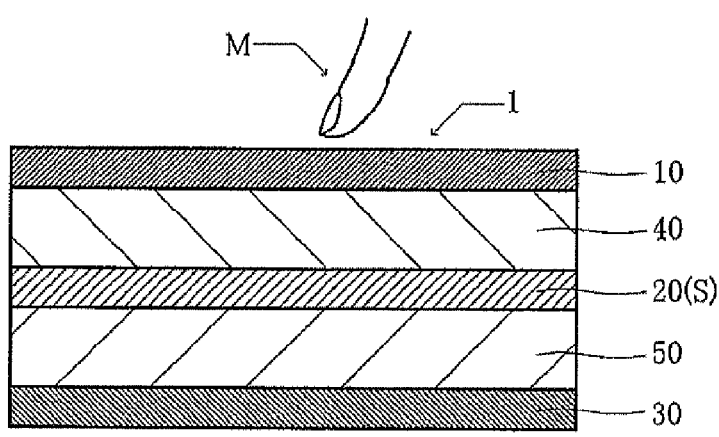
FIG. 2 is a cross section of the touch panel having press detection function.

2. Second Embodiment (1) Entire Structure of the Touch Panel Having Press Detection Function Referring to FIG. 2, the touch panel 1 having press detection function according to the second embodiment of the present invention will be described. FIG. 2 is a cross section of the touch panel having press detection function. Since the basic structure of the touch panel 1 in the second embodiment is the same as that of the first embodiment, characteristic aspects of the second embodiment will be described below.

As shown in FIG. 2, the touch panel 1 of the second embodiment includes the following characteristic aspect: the intermediate electrode 20 includes electrodes S for measuring the electric charge. Since the touch panel 1 is configured as described above, the electrodes S for measuring the electric charge are interposed between the upper electrode 10 and the lower electrode 30. Accordingly, the electrodes S for measuring the electric charge are protected by the upper electrode 10 and the lower electrode 30 from noise around the touch panel 1 (electromagnetic noise or static electricity, especially the electromagnetic noise or static electricity from the input means).

As a result, when the pressing means M applies the pressure to the touch panel 1, it is possible to precisely measure the pressing load. Examples for the touch panel having press detection function according to the second embodiment will be described below.

(2) Example 1

Figure 3:
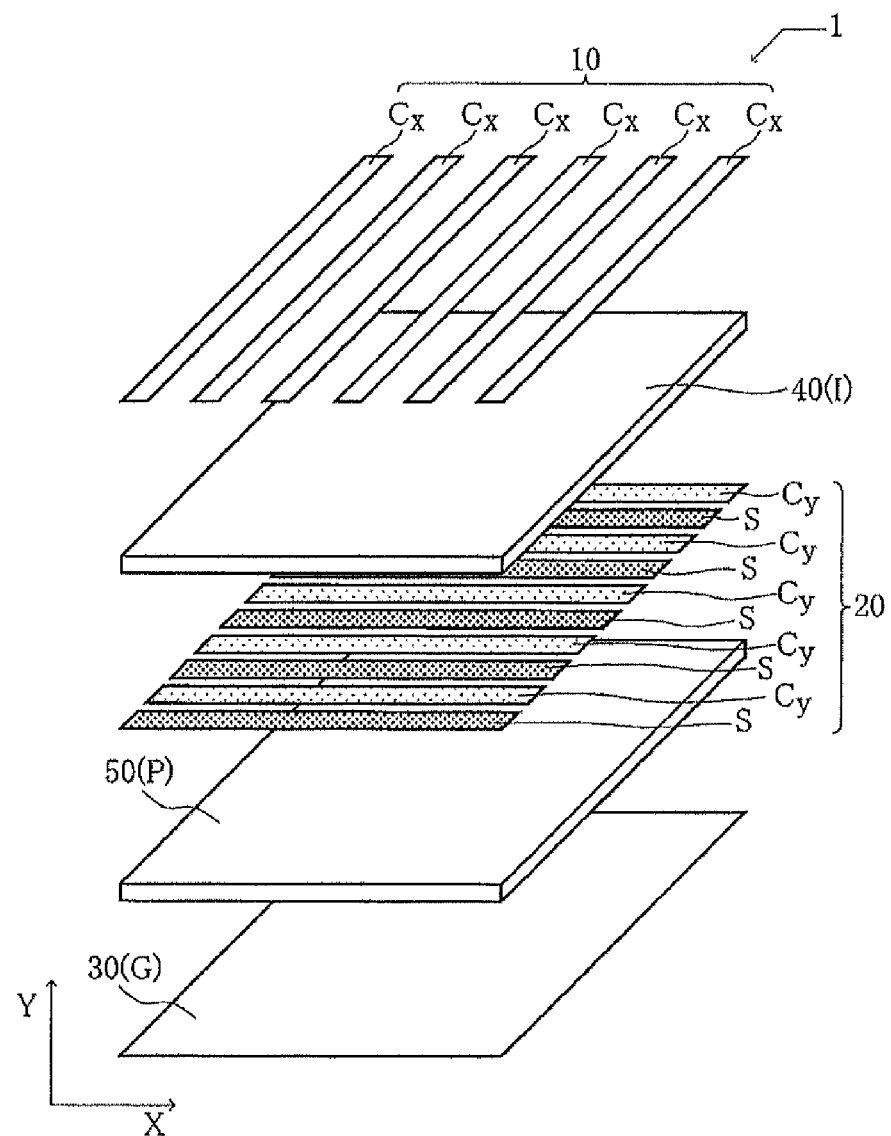
FIG. 3 is a perspective exploded view of the touch panel having press detection function.

FIG. 3 is a perspective exploded view of the touch panel 1 having press detection function according to Example 1. As shown in FIG. 3, the touch panel of Example 1 includes an upper electrode 10, an intermediate electrode 20, a lower electrode 30, an upper insert member 40, and a lower insert member 50.

The upper electrode 10 includes strip-shaped capacitance detection electrodes Cx arranged in X-axis direction. The intermediate electrode 20 includes capacitance detection electrodes Cy arranged in Y-axis direction. Since the upper electrode 10 includes the capacitance detection electrodes Cx and the intermediate electrode 20 includes the capacitance detection electrodes Cy, when the pressure is applied to the touch panel 1, change in capacitance at intersection points defined between the capacitance detection electrodes Cx and the capacitance detection electrodes Cy is measured, so that the input position can be detected.

The intermediate electrode 20 also includes the strip-shaped electrodes S for measuring the electric charge, which are arranged between the capacitance detection electrodes Cy (i.e., portions where the capacitance detection electrodes Cy are not arranged). The lower electrode 30 is a planar reference potential electrode G, and the lower insert member 50, which is arranged between the intermediate electrode 20 and the lower electrode 30, is made of a piezoelectric body P.

Since the piezoelectric body P is arranged between the electrodes S for measuring the electric charge and the reference potential electrode G as described above, the touch panel 1 can detect electric charge generated at the piezoelectric body P with the electrodes S for measuring the electric charge when the pressure is applied. Accordingly, the touch panel 1 can detect the pressing load when the pressures is applied thereto.

As shown in FIG. 3, the electrodes S for measuring the electric charge are arranged between the capacitance detection electrodes Cx and the reference potential electrode G. Accordingly, the electrodes S for measuring the electric charge are protected by the capacitance detection electrodes Cx and the reference potential electrode G from noise around the touch panel 1 (electromagnetic noise or static electricity, especially the electromagnetic noise or static electricity from the input means). As a result, when the pressure is applied to the touch panel 1, it is possible to precisely measure the pressing load.

If the electric charge that is detected at the electrodes S for measuring the electric charge is small, an amplifier may be connected to the electrodes S for measuring the electric charge. If the amplifier is connected to the electrodes S for measuring the electric charge, even if the previously mentioned electric charge is small, signals of the electric charge can be detected with the amplifier.

Furthermore, the touch panel 1 may include a protect member made of glass or plastic on the upper electrode 10. In this case, the capacitance detection electrodes Cx, which constitute the upper electrode 10, may be disposed on a lower surface of the protect member. Furthermore, a display member such as liquid crystal and organic EL may be disposed below the lower electrode 30 of the touch panel 1.

An example has been described in which the capacitance detection electrodes Cx arranged in X-axis direction are arranged as the upper electrode 10, the capacitance detection electrodes Cy arranged in Y-axis direction are disposed as the intermediate electrode 20. Alternatively, the capacitance detection electrodes Cy may be disposed as the upper electrode 10, and the capacitance detection electrodes Cx may be disposed as the intermediate electrode 20. In this case, the electrodes S for measuring the electric charge should be located between the capacitance detection electrodes Cx (i.e., portions where the capacitance detection electrodes Cx are not arranged). In addition, as long as the reference potential electrode G is disposed overlapping the electrodes S for measuring the electric charge via the piezoelectric body P, these electrodes may be partial or patterned.

(3) Example 2

Figure 4:
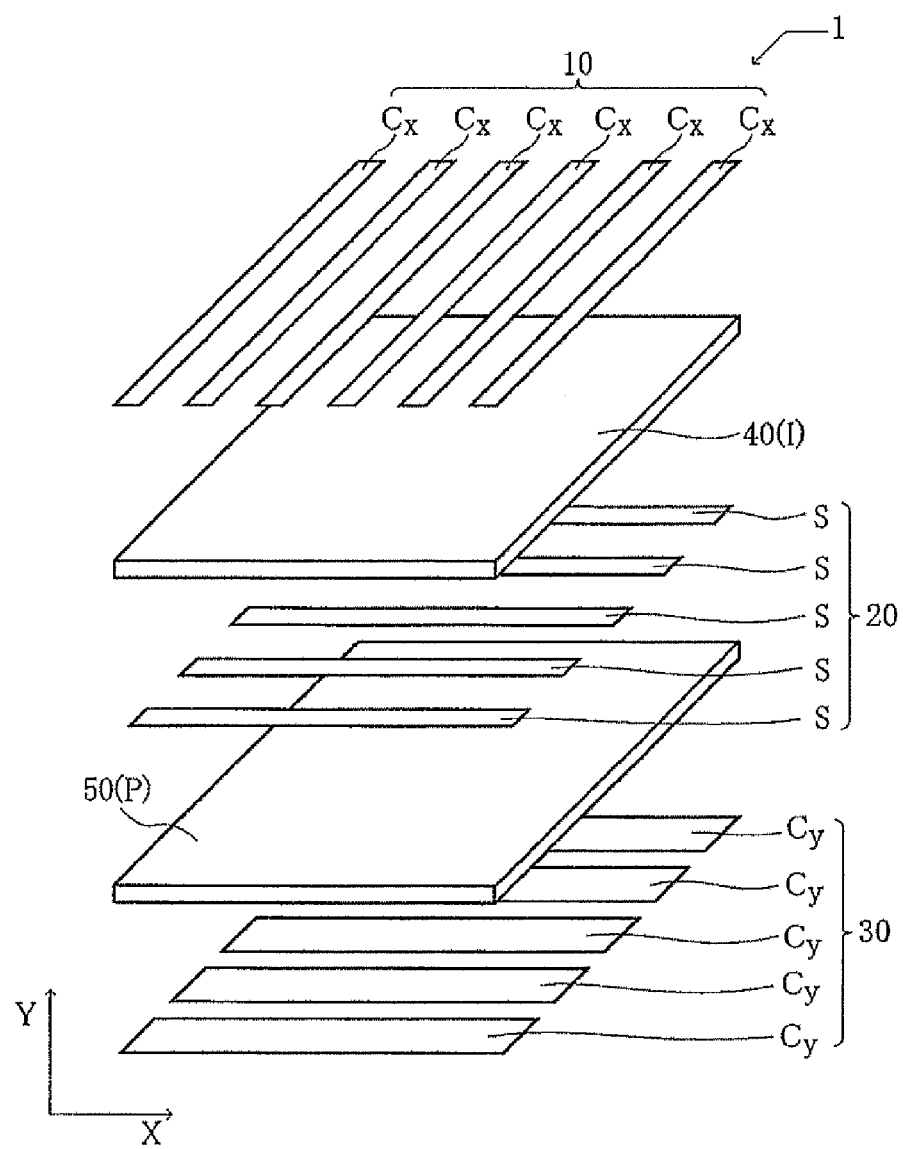
FIG. 4 is a perspective exploded view of the touch panel having press detection function.

FIG. 4 is a perspective exploded view of the touch panel according to Example 2. As shown in FIG. 4, the touch panel 1 of Example 2 includes an upper electrode 10, an intermediate electrodes 20, a lower electrode 30, an upper insert member 40, and a lower insert member 50.

The upper electrode 10 includes strip-shaped capacitance detection electrodes Cx arranged in X-axis direction. The intermediate electrode 20 includes capacitance detection electrodes Cy separately arranged in Y-axis direction. The lower electrode 30 includes strip-shaped capacitance detection electrodes Cy arranged in Y-axis direction.

The upper insert member 40 is composed of an insulating body I, and the lower insert member 50 is composed of a piezoelectric body P.

In the previously mentioned case, the electrodes S for measuring the electric charge is arranged between the capacitance detection electrodes Cx and the capacitance detection electrodes Cy. However, even in this case, since the electrodes S for measuring the electric charge arranged with a gap therebetween, capacitive coupling is achieved between the capacitance detection electrodes Cx and the capacitance detection electrodes Cy. As a result, when the human and touch panel makes contact with each other at intersection points defined between the capacitance detection electrodes Cx and the capacitance detection electrodes Cy, it is possible to measure change in capacitance generated due to the contact and to detect the pressing position when the pressure is applied.

In addition, in the previously mentioned case, it is preferable that the capacitance detection electrodes Cy also function as a reference potential electrode G. Since the capacitance detection electrodes Cy functions as the reference potential electrode G, it becomes possible to detect electric charge generated at the piezoelectric body P by the electrodes S for measuring the electric charge when the pressure is applied. Accordingly, when the pressure is applied, it is possible to detect the pressing load.

As shown in FIG. 4, the electrodes S for measuring the electric charge are arranged between the capacitance detection electrodes Cx and the capacitance detection electrodes Cy. Accordingly, the electrodes S for measuring the electric charge are protected by the capacitance detection electrodes Cx and the capacitance detection electrodes Cy from noise around the touch panel 1 (electromagnetic noise or static electricity, especially electromagnetic noise or static electricity from the input means). As a result, when the pressing means M applies the pressure to the touch panel 1, it is possible to precisely measure the pressing load.

If the electric charge that is detected at the electrodes S for measuring the electric charge is small, an amplifier may be connected to the electrodes S for measuring the electric charge. If the amplifier is connected to the electrodes S for measuring the electric charge, even if the previously mentioned electric charge is small, signals of the previously mentioned electric charge can be detected with the amplifier.

Furthermore, the touch panel 1 may include a protect member made of glass or plastic on the upper electrode 10. In this case, the capacitance detection electrodes Cx, which constitute the upper electrode 10, may be disposed on a lower surface of the protect member. Furthermore, a display member made of liquid crystal or organic EL may be disposed below the lower electrode 30 of the touch panel 1.

The capacitance detection electrodes Cx arranged in X-axis direction are placed as the upper electrode 10, and the capacitance detection electrodes Cy arranged in Y-axis direction and placed as the intermediate electrode 20 in the previously mentioned case. Alternatively, the capacitance detection electrodes Cy may be placed as the upper electrode 10, and the capacitance detection electrodes Cx may be placed as the intermediate electrode 20.

(4) Example 3

Figure 5:
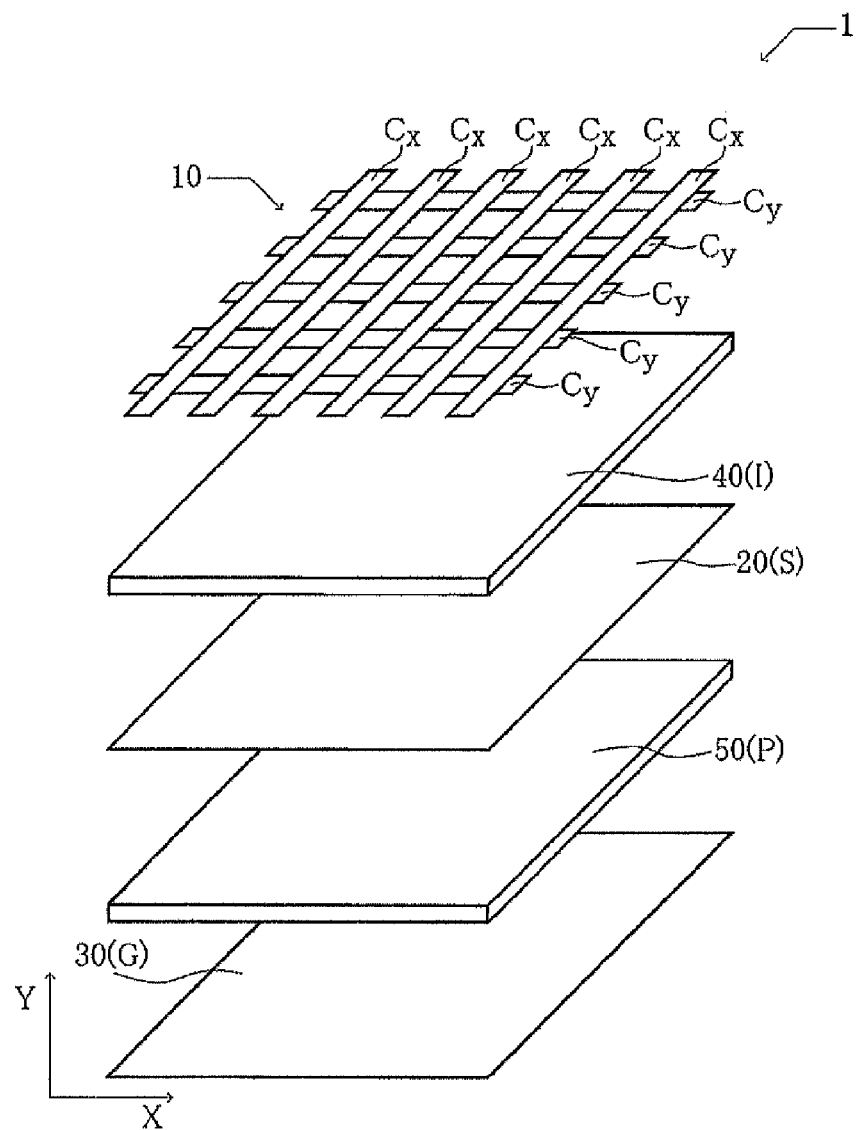
FIG. 5 is a perspective exploded view of the touch panel having press detection function.
Figure 6:
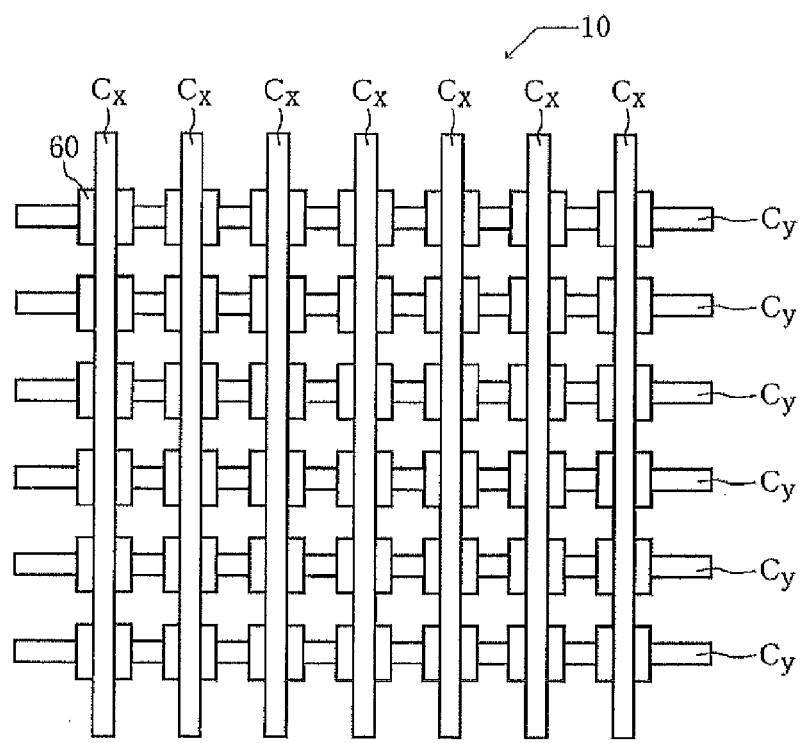
FIG. 6 is a plane view of the upper electrode.

FIG. 5 is a perspective exploded view of the touch panel having press detection function according to Example 3. FIG. 6 is a plane view of the upper electrode. As shown in FIG. 5, the touch panel 1 having press detection function of Example 3 includes an upper electrode 10, an intermediate electrodes 20, a lower electrode 30, an upper insert member 40, and a lower insert member 50.

The upper electrode 10 includes strip-shaped capacitance detection electrodes Cx arranged in X-axis direction and strip-shaped capacitance detection electrodes Cy arranged in Y-axis direction. In this case, as shown in FIG. 6, the capacitance detection electrode Cx and the capacitance detection electrodes Cy are placed nearly in plane. However, insulating members 60 are interposed at intersection points defined between the capacitance detection electrodes Cx and the capacitance detection electrodes Cy, so that the capacitance detection electrodes Cx and the capacitance detection electrodes Cy are electrically insulated from each other. As previously described, since the capacitance detection electrodes Cx and the capacitance detection electrodes Cy are arranged as previously described, when the pressure is applied, change in capacitance at intersection point defined between the capacitance detection electrodes Cx and the capacitance detection electrodes Cy is measured, so that the pressing position can be detected.

As shown in FIG. 5, the intermediate electrode 20 is made of a planar electrodes S for measuring the electric charge, and the lower electrode 30 are made of the planar reference potential electrode G. The lower insert member 50, which are disposed between the intermediate electrode 20 and the lower electrode 30, is made of the piezoelectric body P.

As previously mentioned, if the piezoelectric body P is interposed between the electrodes S for measuring the electric charge and the reference potential electrode G, it is possible to detect the electric charged generated at the piezoelectric body P with the electrodes S for measuring the electric charge when the pressure is applied to the touch panel 1. Accordingly, it is possible to detect the pressing amount.

In addition, as shown in FIG. 5, the electrodes S for measuring the electric charge are disposed between the capacitance detection electrodes Cx, the capacitance detection electrodes Cy, and the reference potential electrode G. Accordingly, the electrodes S for measuring the electric charge are protected by the capacitance detection electrodes Cx, the capacitance detection electrodes Cy, and the reference potential electrode G, from noise around the touch panel 1 (electromagnetic noise or static electricity, especially the electromagnetic noise or static electricity from the input means). As a result, when the pressures is applied to the touch panel 1, it is possible to precisely measure the pressing load.

If the electric charge that is detected at the electrodes S for measuring the electric charge is small, an amplifier may be connected to the electrodes S for measuring the electric charge. If the amplifier is connected to the electrodes S for measuring the electric charge, even if the electric charge is small, signals of the previously mentioned electric charge can be detected with the amplifier.

Figure 7:
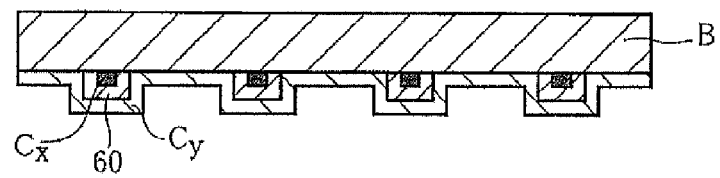
FIG. 7 is a cross section of the upper electrode.

Furthermore, the touch panel 1 may include a protect member made of glass or plastic on the upper electrode 10. In this case, as shown in FIG. 7, the capacitance detection electrodes Cx, which constitute the upper electrode 10, the capacitance detection electrodes Cy, and the insulating members 60 may be disposed on a lower surface of the protect member. Furthermore, a display member made of liquid crystal and organic EL may be disposed below the lower electrode 30 of the touch panel 1.

Although the electrodes S for measuring the electric charge and the reference potential electrode G are planar in the previously mentioned case, as long as the electrodes S for measuring the electric charge and the reference potential electrode G are disposed overlapping each other via the piezoelectric body P, these electrodes can be partial or patterned.

(5) Other Examples

Other examples of the touch panel 1 having press detection function according to the second embodiment will be shown in FIG. 8. As shown in FIG. 8, in Example A1, the upper insert member 40 is composed of an insulating body I, and the lower insert member 50 is composed of a piezoelectric body P. The upper electrode 10 includes capacitance detection electrodes Cx arranged in X-axis direction and capacitance detection electrodes Cy arranged in Y-axis direction. The intermediate electrode 20 includes electrodes S for measuring the electric charge, and the lower electrode 30 includes a reference potential electrode G. Examples A2 through A11 are just illustrated in FIG. 8.

Among the previously mentioned Examples A1 through A11, the following matter is common: the intermediate electrode 20 includes the electrodes S for measuring the electric charge. According to the touch panel 1 configured as described, since the electrodes S for measuring the electric charge is interposed between the upper electrode 10 and the lower electrode 30, it is possible to precisely measure the pressing load when the pressure is applied to the touch panel 1.

Furthermore, in the previously mentioned configuration, it is preferable that the upper electrode 10 be made of the capacitance detection electrodes Cx or the capacitance detection electrodes Cy. Since the upper electrode 10 is composed of the capacitance detection electrodes Cx or the capacitance detection electrodes Cy, when the touch panel having press detection function is pressed, distance between the pressing means and the capacitance detection electrodes Cx, Cy becomes shorter. As a result, change in capacitance between the capacitance detection electrodes Cx and Cy generated by the contact by the human and the touch panel becomes larger, so that the accuracy of position detection is improved.

3. Third Embodiment (1) Entire Structure of the Touch Panel Having Press Detection Function Referring to FIG. 9, the touch panel having press detection function according to third embodiment of the present invention will be described. FIG. 9 is a cross section of the touch panel having press detection function. FIG. 10 is a view showing examples of the third embodiment. Since the basic structure of the touch panel of the third embodiment is the same as the first embodiment, characteristic aspects of the third embodiment will be described below.

As shown in FIG. 9, the touch panel 1 having press detection function of the third embodiment includes the following characteristic aspects: the upper insert member 40 is composed of a piezoelectric body P; the lower insert member 50 is composed of an insulating body I; and either electrode of the upper electrode 10 or the intermediate electrode 20 is electrodes S for measuring the electric charge. Since the touch panel 1 is configured as described above, the piezoelectric body P is arranged in a vicinity of the pressing means M when the pressure is applied to the touch panel 1. As a result, since the piezoelectric body P becomes likely to receive the pressing force from the pressing means M, detection sensitivity to the pressure applied to the touch panel 1 is improved.

Regarding the touch panel 1 having press detection function according to the third embodiment, other methods of arranging the capacitance detection electrodes Cx, the capacitance detection electrodes Cy, the electrodes S for measuring the electric charge, and the reference potential electrode G are shown as in examples B1 to B11 in FIG. 10.

4. Fourth Embodiment (1) Entire Structure of the Touch Panel Having Press Detection Function Referring to FIG. 11, the touch panel having press detection function according to fourth embodiment of the present invention will be described. FIG. 11 is a cross section of the touch panel having press detection function. Since the basic structure of the touch panel in the fourth embodiment is the same as that of the first embodiment, characteristic aspects of the fourth embodiment will be described below.

As shown in FIG. 11, the touch panel 1 having press detection function according to the fourth embodiment has the following characteristic aspects: the upper insert member 40 is composed of an insulating body I; the lower insert member 50 is composed of a piezoelectric body P; and the lower electrode 30 is electrodes S for measuring the electric charge. This configuration allows the electrodes S for measuring the electric charge of the touch panel 1 to be disposed on the lowest surface of the touch panel 1, and not to be disposed between the capacitance detection electrodes Cx arranged in X-axis direction and capacitance detection electrodes Cy arranged in Y-axis direction. Accordingly, when the touch panel 1 is pressed with a pressing means M, capacitive coupling generated by the capacitance detection electrodes Cx and the capacitance detection electrodes Cy become unlikely to be affected by noise generated at electrodes S for measuring the electric charge. Accordingly, the touch panel 1 can precisely measure the pressing position by the pressure when the pressure is applied. Hereinbelow, examples of the touch panel having press detection function according to the fourth embodiment will be described.

(2) Example 1

Figure 12:
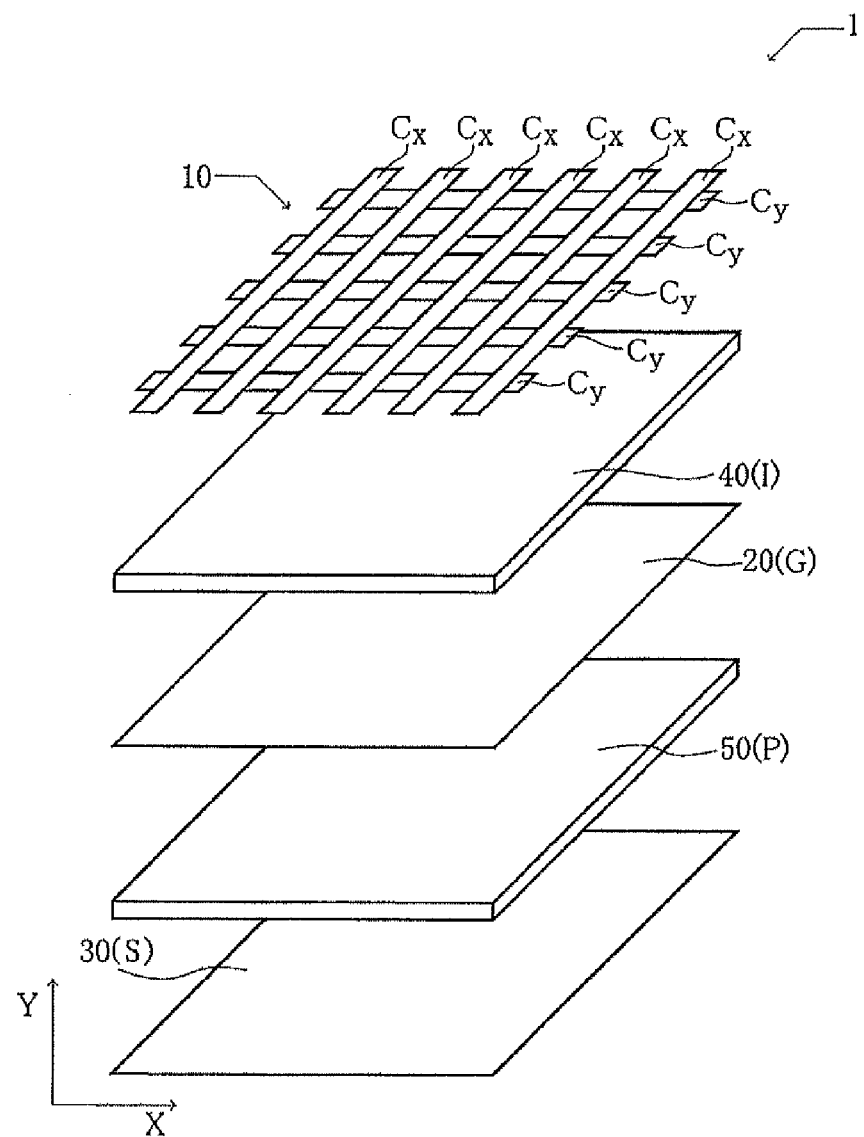
FIG. 12 is a perspective exploded view of the touch panel having press detection function.

FIG. 12 is a perspective exploded view of the touch panel having press detection function according to Example 1.

As shown in FIG. 12, a touch panel 1 having press detection function of Example 1 includes an upper electrode 10, an intermediate electrode 20, a lower electrode 30, an upper insert member 40, and a lower insert member 50.

The upper electrode 10 includes strip-shaped capacitance detection electrodes Cx arranged in X-axis direction and capacitance detection electrodes Cy arranged in Y-axis direction. In this case, as in a case shown in FIG. 6, the capacitance detection electrodes Cx and the capacitance detection electrodes Cy are disposed nearly in plane. However, at intersection point portions defined between the capacitance detection electrodes Cx and the capacitance detection electrodes Cy, insulating members 60 are interposed, so that the capacitance detection electrodes Cx and the capacitance detection electrodes Cy are electrically insulated from each other. As previously described, since the capacitance detection electrodes Cx and the capacitance detection electrodes Cy are arranged as previously described, when the pressure is applied, change in capacitance at intersection points defined between the capacitance detection electrodes Cx and the capacitance detection electrodes Cy is measured, and the pressing position can be precisely detected.

As shown in FIG. 12, the intermediate electrode 20 includes a planar reference potential electrode G, the lower electrode 30 includes a planar electrodes S for measuring the electric charge, and the lower insert member 50, which is interposed between the intermediate electrode 20 and the lower electrode 30, includes a piezoelectric body P.

As described above, since the piezoelectric body P is interposed between the electrodes S for measuring the electric charge and the reference potential electrode G, the touch panel 1 can detect electric charge generated at the piezoelectric body P using the electrodes S for measuring the electric charge when the pressure is applied. Accordingly, the touch panel 1 can detect the pressing load when the pressure is applied.

If the electric charge that is detected at the electrodes S for measuring the electric charge is small, it is better to connect an amplifier to the electrodes S for measuring the electric charge. If the amplifier is connected to the electrodes S for measuring the electric charge, even if the previously mentioned electric charge is small, signals of the electric charge can be detected with the amplifier.

As shown in FIG. 12, since the electrodes S for measuring the electric charge are arranged separate from the capacitance detection electrodes Cx and the capacitance detection electrodes Cy, i.e., the electrodes S for measuring the electric charge are not arranged between the capacitance detection electrodes Cx and the capacitance detection electrodes Cy, capacitive coupling generated between the capacitance detection electrodes Cx and the capacitance detection electrodes Cy is not likely to be affected by noise generated at the electrodes S for measuring the electric charge. Accordingly, when change in capacitance at intersection points between the capacitance detection electrodes Cx and the capacitance detection electrodes Cy is measured, it is possible to precisely detect the position to which the pressure is applied.

Furthermore, as shown in FIG. 12, since the intermediate electrode 20 is composed of the reference potential electrode G, it is possible to electromagnetic noise generated at the electrodes S for measuring the electric charge of the lower electrode 30 can be shielded by the intermediate electrode 20. As a result, the capacitance detection electrodes Cx and the capacitance detection electrodes Cy are not affected by the noise, so that the touch panel 1 can extremely precisely detect a position to which the pressure is applied.

The touch panel 1 in Example 1 may include a protect member made of glass or plastic on the upper electrode 10. In this case, the capacitance detection electrodes Cx, which constitute the upper electrode 10, the capacitance detection electrodes Cy, and the insulating member 60 may be disposed on a lower surface of the protect member. Furthermore, a display member made of liquid crystal and organic EL be disposed below the lower electrode 30 of the touch panel 1.

In the previously mentioned case, the electrodes S for measuring the electric charge and the reference potential electrode G are planar, as long as the electrodes S for measuring the electric charge and the reference potential electrode G are disposed overlapping each other via the piezoelectric body P, these electrodes can be partial or patterned.

(3) Example 2

Figures 13, 14:
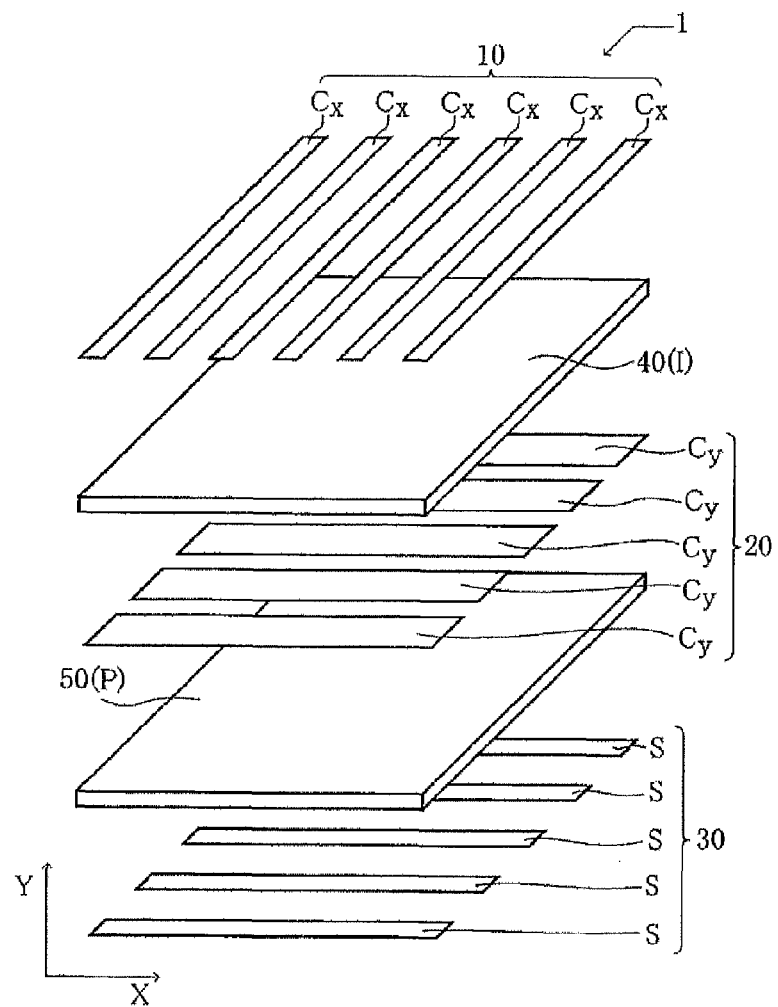
FIG. 13 is a perspective exploded view of the touch panel having press detection function.
FIG. 14 is a view showing examples of the configuration of the touch panel having press detection function.

FIG. 13 is a perspective exploded view of the touch panel having press detection function according to Example 2.

As shown in FIG. 13, the touch panel 1 includes an upper electrode 10, an intermediate electrode 20, a lower electrode 30, an upper insert member 40, and a lower insert member 50.

The upper electrode 10 includes strip-shaped capacitance detection electrodes Cx arranged in X-axis direction. The intermediate electrode 20 includes strip-shaped capacitance detection electrodes Cy arranged in Y-axis direction. The lower electrode 30 are composed of strip-shaped electrodes S for measuring the electric charge arranged in Y-axis direction. The upper insert member 40 is composed of an insulating body I, and the lower insert member 50 is composed of a piezoelectric body P.

As described above, since the electrodes S for measuring the electric charge are arranged separate from the capacitance detection electrodes Cx and the capacitance detection electrodes Cy, i.e., the electrodes S for measuring the electric charge are not arranged between the capacitance detection electrodes Cx and the capacitance detection electrodes Cy, capacitive coupling generated between the capacitance detection electrodes Cx and the capacitance detection electrodes Cy is not likely to be affected by noise generated at the electrodes S for measuring the electric charge. Accordingly, when change in capacitance at intersection points between the capacitance detection electrodes Cx and the capacitance detection electrodes Cy is measured, it is possible to precisely detect the position to which the pressure is applied.

In addition, it is preferable that the capacitance detection electrodes Cy also function as a reference potential electrode G. Since the capacitance detection electrodes Cy functions as the reference potential electrode G, it becomes possible to detect electric charge generated at the piezoelectric body P when the pressure is applied by the electrodes S for measuring the electric charge. Accordingly, when the pressure is applied, it is possible to detect the pressing load.

If the electric charge that is detected at the electrodes S for measuring the electric charge is small, it is better to connect an amplifier to the electrodes S for measuring the electric charge. If the amplifier is connected to the electrodes S for measuring the electric charge, even if the previously mentioned electric charge is small, signals of the electric charge can be detected with the amplifier.

The touch panel 1 having press detection function may include a protect member made of glass or plastic on the upper electrode 10. In this case, the capacitance detection electrodes Cx, which constitute the upper electrode 10, may be disposed directly on a lower surface of the protect member. Furthermore, a display member such as liquid crystal and organic EL may be disposed below the lower electrode 30 of the touch panel 1.

The capacitance detection electrodes Cx arranged in X-axis direction are placed as the upper electrode 10, and the capacitance detection electrodes Cy arranged in Y-axis direction are placed as the intermediate electrode 20 in the previously mentioned case. Alternatively, the capacitance detection electrodes Cy may be placed as the upper electrode 10, and the capacitance detection electrodes Cx may be placed as the intermediate electrode 20. In addition, the electrodes S for measuring the electric charge may be planar.

(4) Other Examples

Other examples of the touch panel having press detection function according to the fourth embodiment are shown in FIG. 14. Other methods of arranging the capacitance detection electrodes Cx, the capacitance detection electrodes Cy, the electrodes S for measuring the electric charge, and the reference potential electrode G, which are placed as the upper electrode 10, the intermediate electrode 20, and the lower electrode 30 are shown in FIG. 14.

5. Other Aspects

Figure 15:
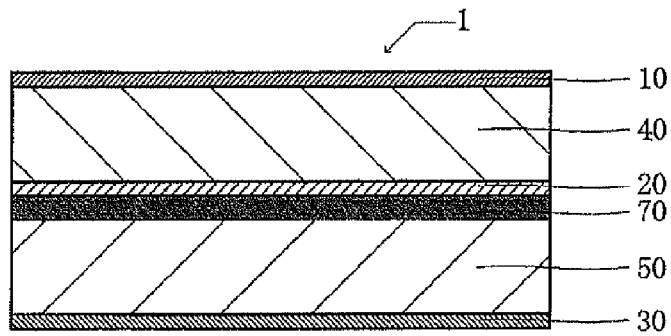
FIG. 15 is a cross section of the touch panel having press detection function.
Figure 16:
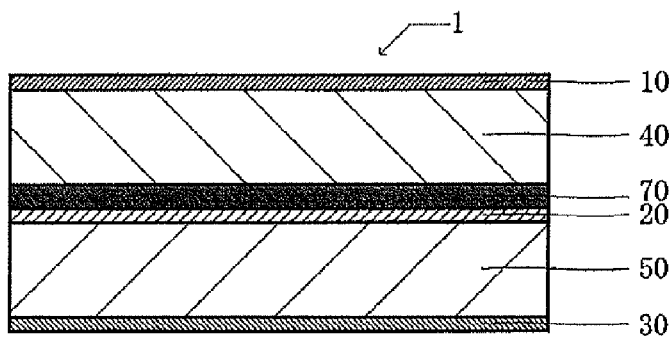
FIG. 16 is a cross section of the touch panel having press detection function.

As shown in FIG. 15 and FIG. 16, the touch panel 1 having press detection function may include an adhesive layer 70 between the upper insert member 40 and the lower insert member 50. The adhesive layer 70 may be disposed between intermediate electrode 20 and the lower insert member 50 as shown in FIG. 15, or may be disposed between intermediate electrode 20 and the upper insert member 40 as shown in FIG. 16.

The touch panel 1 in FIG. 15 may be manufactured by a both-side electrode member having electrodes laminated on an upper surface and a lower surface of the upper insert member 40, and a one-side electrode member having electrodes laminated on a lower surface of the lower insert member 50 may be adhered to each other, using adhesive.

The both-side electrode member may be formed by making a member (DITO) in which ITO is laminated by sputtering on the upper surface and the lower surface of the upper insert member 40, and patterning the ITO with etching. In the previously mentioned case, it is preferable that ITO laminated on the upper surface and the lower surface of the upper insert member 40 be patterned simultaneously. The reason is that if patterned simultaneously, position accuracy of the arrangement positions of the electrodes laminated on the upper surface and the lower surface of the upper insert member 40 becomes more accurate.

The one-side electrode member may be formed by laminating conductive members such as ITO on one surface of the lower insert member 50 with sputtering, and patterning the conductive member with etching.

Next, the touch panel 1 shown in FIG. 16 can be formed by adhering a one-side electrode member, which is formed with electrodes laminated on the upper surface of the upper insert member 40, and a both-side electrode member, which is formed with electrodes laminated on an upper surface and a lower surface of the lower insert member 50, using adhesive. The methods of manufacturing the one-side electrode member and the both-side electrode member are the same as those in the previous examples.

Figure 17:
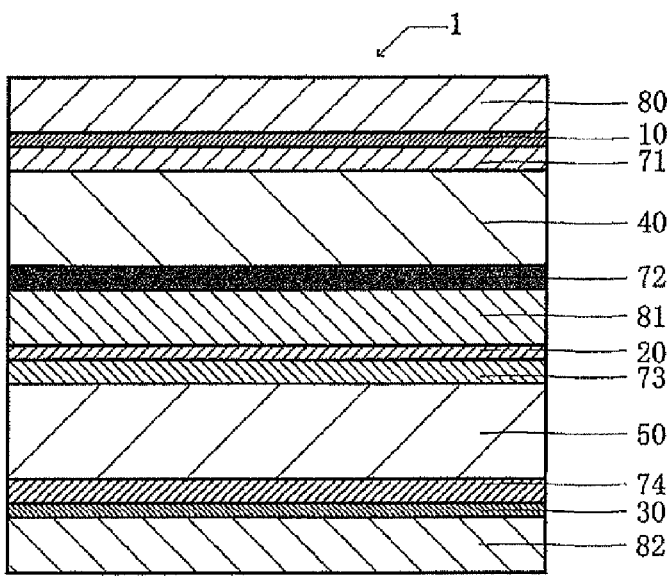
FIG. 17 is a cross section of the touch panel having press detection function.
Figure 18:
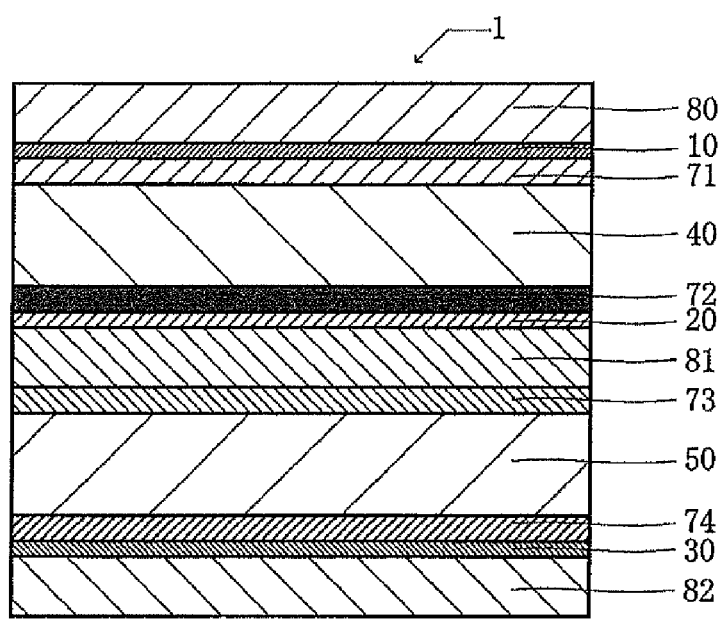
FIG. 18 is a cross section of the touch panel having press detection function.

As shown in FIG. 17 and FIG. 18, if the upper electrode 10, the intermediate electrode 20, and the lower electrode 30 cannot be disposed directly on the upper insert member 40 and the lower insert member 50 in the touch panel 1, conductive sheets having an upper electrode 10, an intermediate electrode 20, and a lower electrode 30 laminated respectively on support members 80, 81, 82, may be adhered to the upper insert member 40 and the lower insert member 50 via adhesive layers 71, 72, 73.

The touch panel 1 shown in FIG. 17 may be formed by adhering one having the conductive sheets made of the support member and an electrode laminated thereon and adhered to the upper surface and the lower surface of the upper insert member 40, and one having the conductive sheet adhered to the lower surface of the lower insert member 50. According to the previously mentioned method, since the electrodes are not formed directly on the upper insert member 40 and the lower insert member 50, even if the upper insert member 40 and the lower insert member 50 is weak to heat, it is preferable because the electrodes can be laminated on these insert members.

The touch panel 1 shown in FIG. 18 may be formed by adhering one having the previously mentioned conductive sheet adhered to the upper surface of the upper insert member 40 and one having the previously mentioned conductive sheets adhered to the upper surface and the lower surface of the lower insert member 50, using adhesive.

In the previously described examples, the support members 80, 81, 82 are basically made of a film member. Alternatively, the support member 80 may be made of a protect member such as glass. If the support member 80 is made of the protect member, the support member 80 has a function as a surface protect member of the touch panel 1 with pressure detection function, and a function as a support member of the upper electrode 10. Accordingly, the touch panel 1 becomes one having a high productivity, and a small thickness.

Furthermore, a display member may be disposed below the touch panel 1, which is made of liquid crystal or organic EL. In this case, it is preferable that the touch panel 1 be made of a transparent member. In addition, in the previously mentioned case, it is preferable that an antireflection process be carried out on the lower surface of the support member 82. The reason is that if the antireflection process is carried out on the previously mentioned portions, the image displayed on the display device becomes likely to be visually recognized.

The invention claimed is:

1. A touch panel having press detection function for detecting a pressing load inputted to a pressing surface, the touch panel comprising:
    an upper electrode, an upper insert member, an intermediate electrode, a lower insert member, and a lower electrode, arranged away from the pressing surface in this order;
    the upper insert member is composed of an insulating body;
    the lower insert member is composed of a piezoelectric body;
    the upper electrode includes first capacitance detection electrodes configured to detect pressing position when input is applied to the touch panel;
    the lower electrode includes second capacitance detection electrodes;
    the intermediate electrode includes detection electrodes for measuring the electric charge configured to detect electric charge according to the pressing; and
    a both-side electrode member and a one-side electrode member are adhered to each other with adhesive, the both-side electrode member having the upper insert member, the upper electrode laminated on an upper surface of the upper insert member, and the intermediate electrode laminated on a lower surface of the upper insert member, and the one-side electrode member having the lower insert member, and the lower electrode laminated on a lower surface of the lower insert member.

2. An electronic device comprising a touch panel having press detection function according to claim 1, and a display member provided under the touch panel, wherein
    the touch panel having press detection function is transparent.

3. A touch panel having press detection function for detecting a pressing load inputted to a pressing surface, the touch panel comprising:

an upper electrode, an upper insert member, an intermediate electrode, a lower insert member, and a lower electrode, arranged away from the pressing surface in this order;

the upper insert member is composed of an insulating body;

the lower insert member is composed of a piezoelectric body;

the upper electrode includes first capacitance detection electrodes configured to detect pressing position when input is applied to the touch panel;

the intermediate electrode includes second capacitance detection electrodes that functions as a reference potential electrode;

the lower electrode includes detection electrodes for measuring the electric charge configured to detect electric charge according to the pressing; and a both-side electrode member and a one-side electrode member are adhered to each other with adhesive, the both-side electrode member having the upper insert member, the upper electrode laminated on an upper surface of the upper insert member, and the intermediate electrode laminated on a lower surface of the upper insert member, and the one-side electrode member having the lower insert member and the lower electrode laminated on a lower surface of the lower insert member.

4. An electronic device comprising a touch panel having press detection function according to claim 3, and a display member provided under the touch panel, wherein the touch panel having press detection function is transparent.

5. A touch panel having press detection function for detecting a pressing load inputted to a pressing surface, the touch panel comprising:

an upper electrode, an upper insert member, an intermediate electrode, a lower insert member, and a lower electrode, arranged away from the pressing surface in this order;

the upper insert member is composed of a piezoelectric body;

the lower insert member is composed of an insulating body;

the upper electrode includes first capacitance detection electrodes configured to detect pressing position when input is applied to the touch panel;

the lower electrode includes second capacitance detection electrodes;

the intermediate electrode includes detection electrodes for measuring the electric charge configured to detect electric charge according to the pressing; and a one-side electrode member and a both-side electrode member are adhered to each other with adhesive, the one-side electrode member having the upper insert member and the upper electrode laminated on an upper surface of the upper insert member, and the both-side electrode member having the lower insert member, the intermediate electrode laminated on an upper surface of the lower insert member, and the lower electrode laminated on a lower surface of the lower insert member.

6. An electronic device comprising a touch panel having press detection function according to claim 5, and a display member provided under the touch panel, wherein the touch panel having press detection function is transparent.

\* \* \* \* \*